United States Patent [19]

Prescott

[11] 4,413,860

[45] Nov. 8, 1983

[54] COMPOSITE DISC

[75] Inventor: Roger Prescott, Johnson City, Tenn.

[73] Assignee: Great Lakes Carbon Corporation, New York, N.Y.

[21] Appl. No.: 315,143

[22] Filed: Oct. 26, 1981

[51] Int. Cl.³ .................... B32B 5/12; B60B 5/02
[52] U.S. Cl. ................... 301/63 PW; 74/572; 428/64; 428/65; 428/105; 428/114; 428/110; 428/112; 428/113; 428/367; 428/902
[58] Field of Search ........... 428/64, 65, 105, 114, 428/53, 80, 110, 109, 112, 113, 408, 367, 902; 74/572; 301/5 R, 63 PW

[56] References Cited

U.S. PATENT DOCUMENTS

| | | | |
|---|---|---|---|
| 3,296,886 | 1/1967 | Reinhart | 74/572 |
| 3,700,535 | 10/1972 | McCoy | 161/47 |
| 3,839,133 | 10/1974 | Heighes | 428/65 |
| 4,187,932 | 2/1980 | Zarembka | 188/73.2 |
| 4,207,778 | 6/1980 | Hatch | 74/572 |
| 4,237,175 | 12/1980 | Kobayashi | 428/192 |
| 4,255,478 | 3/1981 | Crane | 428/114 X |
| 4,266,442 | 5/1981 | Zorzi | 74/572 |
| 4,320,159 | 3/1982 | Ogawa et al. | 428/64 |
| 4,341,830 | 7/1982 | Betts | 428/65 |

FOREIGN PATENT DOCUMENTS

| | | |
|---|---|---|
| 54-54177 | 4/1979 | Japan . |
| 54-54178 | 4/1979 | Japan . |
| 2067123 | 7/1981 | United Kingdom . |

Primary Examiner—Alexander S. Thomas
Attorney, Agent, or Firm—Adrian J. Good

[57] ABSTRACT

Method of manufacture of discs of fiber-reinforced composite comprising layers of segments with axial and circumferential fiber alignment for superior stiffness and resistance to radial and circumferential stresses in the plane of the disc.

9 Claims, 5 Drawing Figures

COMPOSITE DISC

DESCRIPTION

BACKGROUND OF THE INVENTION

Innovation in the field of fiber reinforced materials has occurred rapidly in recent years with the development of new reinforcing fibers and matrix materials. A variety of techniques for the manufacture of fiber reinforced composite structures is now well established. Some of these methods involved the production of fiber-resin sheets, with fibers arranged in parallel and held together with an uncured resin of high viscosity. A composite component is fabricated from such sheet material by cutting, from the sheet, sections of appropriate shape and fiber orientation and then stacking the sheet sections in a mold and applying pressure and heat to shape and cure the components. This invention provides a method for utilization of fiber-resin sheet, containing parallel fibers, for the manufacture of circular discs, plates, and the like.

Brit. No. 1,364,076, British Aircraft Corp. Ltd., Aug. 21, 1974, Int. Cl B32B 5/12 5/28 discloses laminated fiber reinforced plastics sheets with the individual plies at 60° to each other. U.S. Pat. No. 3,174,895, Gibson et al., Mar. 23, 1965, Cl. 161-259, discloses graphitized cellulose cloth laminates bonded with a carbonized binder. U.S. Pat. No. 3,700,535 McCoy et al., Oct. 24, 1972, Cl. 161-47 discloses a conical fiber structure for rocket nose cones comprised of alternate layers or plies of carbon fibers at oppositely angled relationship. U.S. Pat. No. 1,601,911 Godfrey, Oct. 5, 1926, discloses a textile based gear blank of overlapping plies, the cords crossing at acute angles. U.S. Pat. No. 1,473,998, Mixsell, Nov. 13, 1923, discloses a flexible valve diaphragm made with overlapping cord plies. U.S. Pat. No. 2,093,640 Millemaar, Sept. 21, 1937, Cl 154-1, discloses a gear blank made from overlapping composites. Rabenhorst, *SAMPE quarterly*, January 1975, at 23, discusses high speed flywheel designs.

Japanese Application 1979-54177, Kitagawa, published Apr. 28, 1979, discloses a fiber reinforced high speed rotor using fan-shaped and stripped unidirectional satin weave cloth sections.

U.S. Pat. No. 4,207,778, Hatch, June 17, 1980 discloses a flywheel of a cross-ply composite with a rim portion of circumferentially wound fibers impregnated with a binder.

SUMMARY OF THE INVENTION

This invention pertains to a method for the manufacture of substantially circular discs posessing high strength and rigidity in the radial and circumferential directions. Further, this invention describes an economical method for the utilization of fiber reinforcing materials in the manufacture of such structurally superior discs.

By the method of this invention a tow, roving or yarn of fibers or a series of such tows or rovings of sufficient continuous length is wetted with an appropriate thermoplastic or thermosetting resin and formed into a prepreg tape with about 0.1-0.5 mm. (0.004 to 0.020 inch) thickness and of sufficient width to accommodate the hereinafter described steps. Segments for a substantially circular disc or polygon are formed from the tape in such a manner that the filaments are (A) approximately parallel and (B) approximately normal to the line from the midpoint of the base to the vertex of an isosceles triangle defining the segment. The principal angle opposite the base of the wedge is no more than 60°, preferably about 5°-45°, forming an isosceles triangle. The fibers are thus (A) approximately normal and (B) approximately parallel to the bases of the isosceles triangles thus formed. The wedges are then formed into a multilayer disc with each layer usually composed of one type of wedge and alternating layers arranged in a specific sequence such as ABAB or as AABBAA. The abutting edges of the segments in the layers are staggered to counteract the weakening effect of the discontinuity of the fibers. The resulting multilayered disc is pressed and cured as hereinafter described.

The discs manufactured by this method have a variety of applications dependent on their light weight, strength, stiffness, fatigue and creep resistance, etc. They may be coated with a film containing magnetically susceptible particles, particularly iron and chromium and their oxides and used as computer memory discs. They may be used in energy storage devices as the basis for high speed flywheels. They may be used as gear, wheel, turbine and pulley blanks, where their stiffness is most useful, by machining a groove or teeth in the disc or affixing to the disc appropriate rims, tires, blades, etc.

DESCRIPTION OF THE PREFERRED EMBODIMENT

Composite materials as they are presently defined are mixtures of macroscopic phases which are composed of materials in a defined state that generally differ in form and composition. This invention is related to a method for the manufacture of substantially circular discs of a composite comprising carbon or other reinforcing fibers and a thermosetting or thermoplastic resin and the discs manufactured by the defined process.

Composite discs of this invention are prepared from the following materials:

Carbon fibers. Carbon fibers are usually prepared from polyacrylonitrile (PAN) fiber precursors, although rayon and other fibers have been used. Typically, a PAN fiber is heated in an oxygen-containing atmosphere at about 200°-300° C. for a time sufficient to allow the temperature to be raised further without subsequent loss of the filamentous nature of the precursor, then carbonized to about 900° C. and optionally graphitized to 1200° to 2700° C. in nitrogen or argon.

Carbon fibers, particularly rayon and acrylic based fibers, may be surface treated after graphitization to improve the bond between the fiber and a resin matrix when the fiber is to be used in a fiber-resin composite. Such surface treatment generally consists of the oxidative modification of the surface.

Other useful fibers include those composed of glass, aromatic polyamides, boron, and various metals.

Matrix resins useful for this invention include thermoplastic and thermosetting resins well known to those skilled in the art of fiber resin composites. Resins useful for preparing the composites of this invention include phenolic, polyimide, polyester, nylon, epoxy, polycarbonate and the like.

The manufacture of prepreg tapes and broad goods from the resins and fibers described above is well known. In a batch operation, an appropriate quantity of the carbon or graphite fiber is spread in a parallel lay-up on a flat surface to the thickness and width needed. A measured quantity of resin is added to the fibers, with or without the addition of a solvent to improve uniformity of impregnation; and the solvent, if any, is removed.

In a continuous operation, the fibers can be spread and resin added by passing over and through a series of appropriately spaced rolls above and within a container of the matrix resin or resin/solvent mixture. The solvent is removed by passage through a heating zone at a temperature sufficient to evaporate the solvent. Otherwise the fibers can be impregnated by the so called melt transfer technique, where the resin is transferred to the fiber by contact with a moving belt containing the resin at a temperature high enough to maintain the resin in a plastic state without the addition of solvent.

Figure 2:
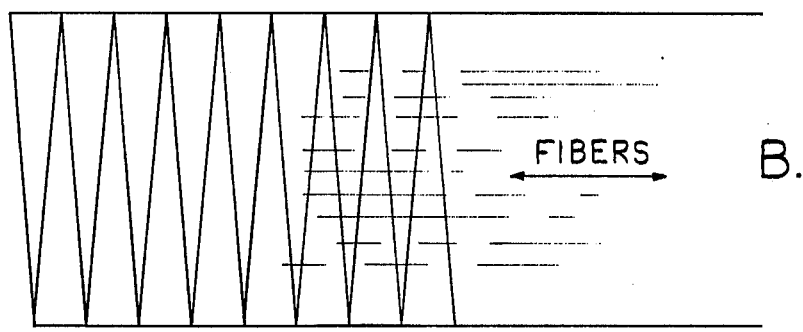
FIG. 2 shows a carbon fiber-resin tape cut in the second manner (B) in a preferred embodiment of the invention so that the fibers are substantially normal to the line from the midpoint of the base to the vertex of an isosceles triangle defining the wedge.
Figure 1:
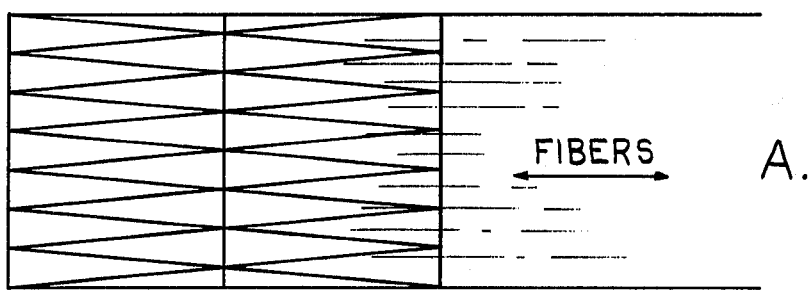
FIG. 1 shows a fiber-resin tape cut in one manner (A) as described in a preferred embodiment of the invention so that the fiber lengths are substantially parallel to the line from the midpoint of the base to the vertex of an isosceles triangle defining the wedge.
Figure 3:
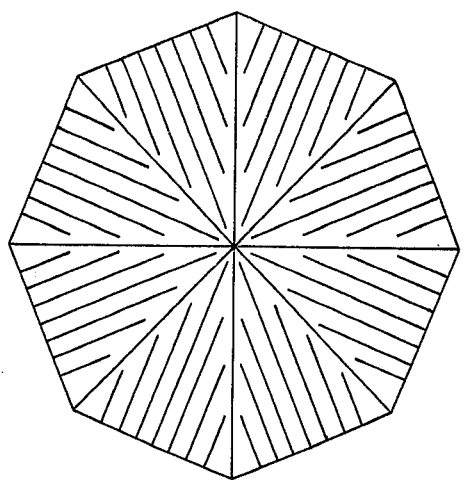
FIG. 3 shows a single layer disc with wedges (A)
Figure 4:
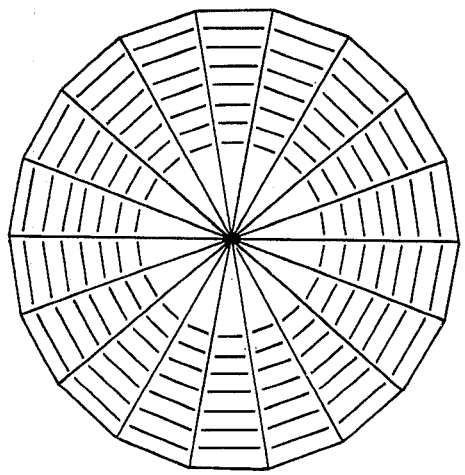
FIG. 4 shows a single layer disc with wedges (B)

The resulting tape is then cut into isosceles triangular segments with lines from the midpoints of the base to the vertices opposite equivalent to the radius of the required disc and principal angles from 5° to 60°. The segments are of two types, those designated (A), whose lines from the midpoints of the bases to the vertices opposite is parallel to the fiber alignment in the tape and those designated (B), whose lines from the midpoint of the bases to the vertices opposite is normal to the fiber alignment. In order to conserve materials, the several segments are cut as shown in FIGS. 1 and 2.

Figure 5:
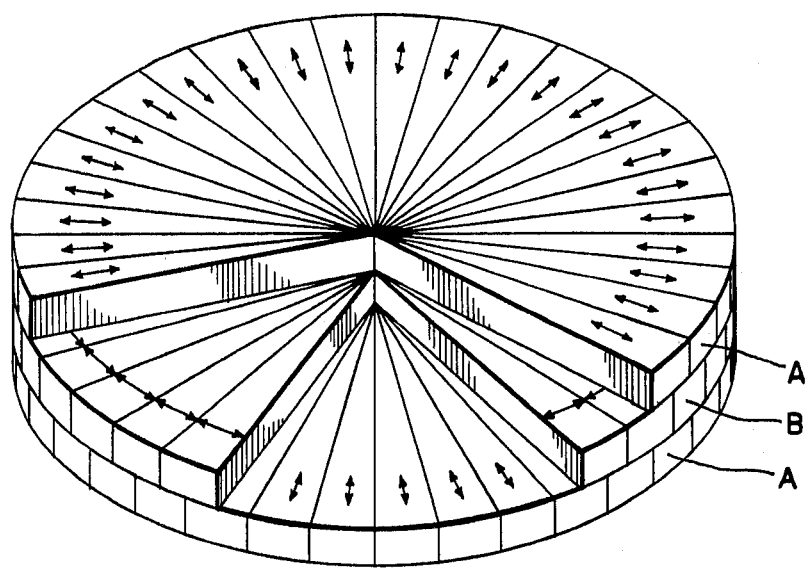
FIG. 5 shows a completed disc manufactured by the method of the invention, with the plies laid up in an ABA pattern, and the abutting edges staggered between layers.

Lay-ups are then made of the different segments to form regular polygonal shapes. A typical alternating ply lay-up is shown in FIG. 5. The plies may be laid up in an alternating pattern, exemplified by the designation ABABA, or in other regular sequential patterns, as for example AABBAABB, ABBABB, depending on the performance desired and the production facilities available, or in a randomly oriented sequence. Each ply is normally constructed of like segments, either all A, or all B type. In special instances such as for particular vibration requirements, a single ply may be made up of both types of segments, either sequentially or randomly oriented. Abutting edges should be offset between layers to minimize the effect of the discontinuity of the fibers. The appropriately stacked segments are then pressed to the desired thickness and the resin cured.

The rim of the polygonal disc is generally machined to form a circular disc with a rim having a radius equal to the centerline of the isosceles triangles from which it was formed.

Better understanding of this invention can be obtained from the following examples which are illustrative of the preferred embodiment thereof.

EXAMPLE I

Twelve 7.6m (25′) bands of 40,000 filament carbon fiber tow are laid parallel and about 2.5 cm (one inch) apart, and impregnated with an epoxy resin-curing agent composition (Epon 1028, Shell Chem. Co.) and spread to a prepreg tape width of 30.5 cm (12 in.). One hundred and eight isosceles triangular segments of 30.5 cm (12 in.) length and 5.3 cm (2.1 in.) base are cut crosswise from the tape and 108 segments of 30.5 cm (12 in.) length and 5.3 (2.1 in.) base are cut lengthwise from the tape. A six-ply disc is laid up with alternating plies composed of lengthwise (A) and cross-cut (B) segments forming a regular polygon defining a rim. The abutting edges of each segment are off-set between layers.

The resulting disc is pressed in a closed compression mold to 689 kPa, (100 psi) and cured at 177° C. (350° F.) for 2 hours.

EXAMPLE II

Eight 3.7 m (12′) bands of 40,000 filament carbon fiber tow are laid parallel and about 2.5 cm (one in.) apart, impregnated with an epoxy resin composition, (Epon 1028) and spread to a prepreg tape width of 18 cm (7.1 in.). 216 isosceles triangular segments of 18.0 cm (7.1 in.) length and 3.2 cm (1.3 in.) bases are cut crosswise from the tape and 216 isosceles triangular segments of 18.0 cm (7.1 in.) length and 3.2 cm (1.3 in.) base are cut lengthwise from the tape. A 12-ply disc is laid up with alternating plies composed of lengthwise (A) and cross-cut (B) segments. The butting edges of each wedge are offset between layers to minimize the strength loss due to fiber discontinuity.

The resulting disc is pressed in a closed compression mold to 689 kPa (100 psi) and cured at 177° C. (350° F.) for 2 hours. After cure the disc is machined to form a right cylinder of 35.6 cm (14.0″) rim diameter and a hole of 16.8 cm (6.61 inches) diameter is cut in the center of the disc.

I claim:

1. A fiber reinforced composite disc comprised of a plurality of plies consisting of (A) and (B) wedge-shaped isosceles triangular segments cut from a parallel lay-up fiber-resin prepreg tape with the angle at the vertex of the two equal sides of no more than 60°, said vertex being coincident with the center of each of said plies of said disc, a line bisecting said vertex angle to the midpoint of the base of said isosceles triangular segment opposite said vertex being coincident with a radius of said disc, each of said (A) segments having fibers approximately parallel to said radius and normal to said base, each of said (B) segments having fibers approximately normal to said radius and approximately parallel to said base, each of said plies consisting of all said (A) or all of said (B) segments laid up with the sides of equal length abutting and coincident with radii of said disc, said bases forming a regular polygon defining a rim, said plies stacked with the centers in alignment and the edges defined by said sides of equal length of said segments off-set between said plies.

2. The disc of claim 1 wherein the boundary defining a plurality of polygons is machined to a boundary defining a right cylinder with the same axis as the original said disc.

3. The disc of claim 1 wherein the type (A) and type (B) plies are laid up in an alternating manner, exemplified by a pattern of layers of plies denoted as ABABABA.

4. The disc of claim 1 wherein the formed segments have an angular width from about 5° to about 45°.

5. The disc of claim 1 to which an appropriate rim and tire have been affixed making said disc suitable for use as a wheel.

6. A kinetic energy storage flywheel comprising the disc of claim 1.

7. The disc of claim 1 wherein the type (A) and type (B) plies are laid up in a regularly occuring sequential pattern.

8. The disc of claim 1 wherein the segments forming the separate plies are cut from a carbon fiber-thermosetting resin prepreg composition.

9. The disc of claim 1 wherein the resin is an epoxy resin-curing agent composition, and the angle at the vertex of the two equal sides is from 5° to 45°, said disc being produced by laying up a plurality of said plies and pressing said disc in a compression mold at approximately 689 k Pa (100 psi), and curing for two hours at approximately 177° C. (350° F.) and machining to a right cylinder with the same central axis as the original series of polygons.

* * * * *